United States Patent
Cheng et al.

(10) Patent No.: US 7,593,912 B2
(45) Date of Patent: Sep. 22, 2009

(54) METHOD FOR EVALUATING RELIANCE LEVEL OF A VIRTUAL METROLOGY SYSTEM IN PRODUCT MANUFACTURING

(75) Inventors: Fan-Tien Cheng, Tainan (TW); Yeh-Tung Chen, Kaohsiung Hsien (TW); Yu-Chuan Su, Tainan Hsien (TW)

(73) Assignee: National Cheng Kung University, Tainan (TW)

( * ) Notice: Subject to any disclaimer, the term of this patent is extended or adjusted under 35 U.S.C. 154(b) by 339 days.

(21) Appl. No.: 11/617,957

(22) Filed: Dec. 29, 2006

(65) Prior Publication Data
US 2007/0282767 A1 Dec. 6, 2007

(30) Foreign Application Priority Data
May 10, 2006 (TW) ............................. 95116617 A (51) Int. Cl.
G06F 15/00 (2006.01)
G06F 15/18 (2006.01)
(52) U.S. Cl. .......................................... 706/62; 706/15
(58) Field of Classification Search ................ 706/62
See application file for complete search history.

(56) References Cited

U.S. PATENT DOCUMENTS

| | | | | |
|---|---|---|---|---|
| 7,152,027 B2* | 12/2006 | Andrade et al. | ............... | 703/21 |
| 7,209,798 B2* | 4/2007 | Yamashita et al. | ........... | 700/121 |
| 7,313,279 B2* | 12/2007 | Duan et al. | ................ | 382/195 |
| 7,324,193 B2* | 1/2008 | Lally et al. | .............. | 356/237.2 |
| 7,328,418 B2* | 2/2008 | Yamashita et al. | ............ | 716/10 |
| 7,359,759 B2* | 4/2008 | Cheng et al. | ................ | 700/121 |
| 7,437,199 B2* | 10/2008 | Willis et al. | ................... | 700/21 |
| 7,444,310 B2* | 10/2008 | Meng et al. | ................... | 706/15 |
| 7,477,960 B2* | 1/2009 | Willis et al. | ................ | 700/121 |
| 7,483,868 B2* | 1/2009 | Meng et al. | ................... | 706/26 |
| 7,493,185 B2* | 2/2009 | Cheng et al. | ............... | 700/108 |
| 7,502,709 B2* | 3/2009 | Funk et al. | ................... | 702/127 |
| 7,533,006 B2* | 5/2009 | Huddleston et al. | ........... | 703/2 |

OTHER PUBLICATIONS

Evaluating Reliance Level of a Virtual Metrology System Fan-Tien Cheng; Yeh-Tung Chen; Yu-Chuan Su; Deng-Lin Zeng; Semiconductor Manufacturing, IEEE Transactions on vol. 21, Issue 1, Feb. 2008 pp. 92-103 Digital Object Identifier 10.1109/TSM.2007.914373.*

(Continued)

*Primary Examiner*—Michael B Holmes
(74) *Attorney, Agent, or Firm*—Michael A. Glenn; Glenn Patent Group (57) ABSTRACT

A method for evaluating reliance level of a virtual metrology system is disclosed. In this method, a reliance index (RI) and a RI threshold value are calculated by analyzing the process data of production equipment, thereby determining if the virtual metrology result is reliable. Besides, in this method, a global similarity index (GSI) and individual similarity indexes (ISI) are also provided for defining the degree of similarity between the current set of process data and all of the sets of historical process data used for establishing the conjecture model, thereby assisting the RI in gauging the degree of reliance and locating the key parameter(s) that cause major deviation.

15 Claims, 7 Drawing Sheets

OTHER PUBLICATIONS

Method for Evaluating Reliance Level of a Virtual Metrology System Fan-Tien Cheng; Yeh-Tung Chen; Yu-Chuan Su; Deng-Lin Zeng; Robotics and Automation, 2007 IEEE International Conference on Apr. 10-14, 2007 pp. 1590-1596 Digital Object Identifier 10.1109/ROBOT.2007.363551.*

Multivariate simulation assessment for virtual metrology Yeh-Tung Chen; Haw-Ching Yang; Fan-Tien Cheng; Robotics and Automation, 2006. ICRA 2006. Proceedings 2006 IEEE International Conference on May 15-19, 2006 pp. 1048-1053 Digital Object Identifier 10.1109/ROBOT.2006.1641848.*

Automatic virtual metrology system design and implementation Yi-Ting Huang; Hsien-Cheng Huang; Fan-Tien Cheng; Tai-Siang Liao; Fu-Chien Chang; Automation Science and Engineering, 2008. Case 2008. IEEE International Conference on Aug. 23-26, 2008 pp. 223-229 Digital Object Identifier 10.1109/COASE.2008.4626524.*

Developing a selection scheme for dual virtual-metrology outputs Wei-Ming Wu; Fan-Tien Cheng; Deng-Lin Zeng; Tung-Ho Lin; Jyun-fang Chen; Automation Science and Engineering, 2008. Case 2008. IEEE International Conference on Aug. 23-26, 2008 pp. 230-235 Digital Object Identifier 10.1109/COASE.2008.4626525.*

Chryssolouris, G., et al, "Confidence Interval Prediction for Neural Network Models", IEEE Transactions on Neural Networks, Jan. 1996, pp. 229-232, vol. 7, No. 1.

Djurdjanovic, D., et al., "Watchdog Agent—An Infotronics-Based Prognostics Approach for Product Performance Degradation Assessment and Prediction", Advanced Engineering Informatics, 2003, pp. 109-125, vol. 17.

Rivals, I., at al, "Construction of Confidence Intervals for Neural Networks Based on Least Squares Estimation", Neural Networks, 2000, pp. 463-484, vol. 13.

Yan, J., et al., "Introduction of Watchdog Prognostics Agent and Its Application to Elevator Hoistway Performance Assessment", Journal of Chinese Institute of Industrial Engineers, 2005, pp. 56-63, vol. 22, No. 1.

* cited by examiner

FIG. 7 ure problem of a VMS.
METHOD FOR EVALUATING RELIANCE LEVEL OF A VIRTUAL METROLOGY SYSTEM IN PRODUCT MANUFACTURING

RELATED APPLICATIONS

The present application is based on, and claims priority from, Taiwan Application Serial Number 95116617, filed May 10, 2006, the disclosure of which is hereby incorporated by reference herein in its entirety.

BACKGROUND

1. Field of Invention

The present invention relates to a method for evaluating a virtual metrology system is disclosed. More particularly, the present invention relates to a method for evaluating reliance level of the virtual metrology system suitable for use in production equipment of a semiconductor or thin film transistor liquid crystal display (TFT-LCD) plant.

2. Description of Related Art

In most semiconductor and TFT-LCD plants, product quality is monitored by sample-testing, that is the products in manufacturing process are selectively tested periodically, or dummy materials (such as monitoring wafers or glass) are applied in a manufacturing process and tested to determine the acceptability of the process quality. The conventional method generally assumes that abnormal conditions regarding process quality of production equipment do not occur abruptly, and thus measurement results of the selected products or the dummy materials can be used to infer the product quality during a specific production period. However, the conventional monitoring method can merely know the quality of the selected products or dummy materials being tested, and cannot know the quality of the products in-between the selected ones. If the production equipment exhibits abnormalities during any two selected tests, the conventional monitoring method cannot identify the abnormalities sufficiently quickly, thus inferior products may be produced.

For resolving the above problem, comprehensive testing of all products is necessary. However, testing every product requires the installation of large amounts of metrology equipment and also requires considerable cycle time. Large amounts of dummy materials are also wasted. Therefore, a virtual metrology method must be developed for monitoring process quality without taking actual measurements, such that quality of production process can be seamlessly monitored in real time. Moreover, virtual metrology is also essential for wafer-to-wafer advanced process control.

When a virtual metrology system (VMS) is used to conjecture a virtual measurement value of a product, if the product happens to be a selected test sample that has an actual measurement value, then the conjecture error of the virtual measurement value can be evaluated. However, in most cases the product is not a selected test sample, such that no actual measurement value can be provided for comparison with the virtual measurement value. Thus, the accuracy of the virtual measurement value is unknown. Users consequently cannot appreciate in real time what the reliance level of the virtual measurement value is, causing hesitation in application. This phenomenon is attributed to the so-called applicability or manufacturability problem of a VMS.

While surveying the relevant research, Chryssolouris et al. (G. Chryssolouris, M. Lee, and A. Ramsey, "Confidence Interval Prediction for Neural Network Models," IEEE Transactions on Neural Networks, vol. 7, no. 1, pp. 229-232, 1996.) and Rivals/Personnaz (I. Rivals, and L. Personnaz, "Construction of Confidence Intervals for Neural Networks Based on Least Square Estimation," Neural Networks, vol. 13, pp. 463-484, 2000.), presented methods of establishing confidence intervals in neural-network prediction models. However, the confidence intervals they established are not sufficiently practical for resolving the manufacturability problem of a VMS.

Djurdjanovic et al. (D. Drurdjanovic, J. Lee, and J. Ni, "Watchdog Agent—An Infotronics-Based Prognostics Approach for Product Performance Degradation Assessment and Prediction," Advanced Engineering Informatics, vol. 17, pp. 109-125, 2003.) as well as Yan and Lee (J. Yan and J. Lee, "Introduction of Watchdog Prognostics Agent and Its Application to Elevator Hoistway Performance Assessment," Journal of the Chinese Institute of Industrial Engineers, vol. 22, no. 1, pp. 56-63, 2005.), presented the concept of performance confidence value (CV) for assessing performance degradation using a watchdog prognostics agent. However, the above studies do not set up a proper threshold value for the performance CV. The proposed assessment method can thus only obtain a numerical performance confidence value, but cannot explicitly determine whether the performance CV is reliable or not.

SUMMARY

Hence, a method for evaluating the reliance level of a VMS is provided to overcome the limitations of the conventional skills in resolving the manufacturability problem of a VMS.

One aspect of the present invention is to define a reliance index (RI) for evaluating reliance level of a VMS, thereby evaluating reliance level of a conjecture result from the VMS.

The other aspect of the present invention is to formulate process data similarity indexes (SIs), including global similarity index (GSI) and individual similarity index (ISI), to assess the degree of similarity between the input set of process data and the sets of historical process data used for establishing the conjecture model. The GSI and ISI are applied to gauge the similarity level to assist the RI in consolidating VMS reliance level and identifying the key parameter(s) that cause major deviation.

In accordance with the aforementioned aspects, a method for evaluating reliance level of a VMS is provided. According to a preferred embodiment of the present invention, the method is divided into training, tuning, and conjecture phases.

In the training phase, at first, a plurality of sets of historical process data belonging to a piece of production equipment are obtained, wherein each set of the historical process data includes process parameters and the data corresponding thereto. Meanwhile, a plurality of historical actual measurement values are also obtained from a piece of measurement equipment, wherein the historical actual measurement values are the measurement values of the products which are manufactured in accordance with the sets of historical process data respectively. Therefore, a conjecture model is established by using the sets of historical process data and the historical actual measurement values, wherein the conjecture model is built in accordance with a conjecture algorithm. Meanwhile, a reference model is established by using the same sets of historical process data and the same historical actual measurement values, wherein the reference model is built in accordance with a reference algorithm, and the conjecture algorithm is different from the reference algorithm. The conjecture algorithm and the reference algorithm can be selected from the group consisting of a multi-regression (MR) algorithm, a neural-network (NN) algorithm, and a time-series algorithm.

Further, the sets of historical process data are inputted into the conjecture model so as to calculate a plurality of historical virtual measurement values, and the sets of historical process data are inputted into the reference model so as to calculate a plurality of historical reference prediction values. Thereafter, the overlap areas between the statistical distributions of the historical virtual measurement values and the statistical distributions of the historical reference prediction values are respectively calculated, thereby generating a plurality of historical reliance indexes (RIs). Then, a maximal error limit ($E_L$) is assigned. When the error between the virtual measurement value and the reference prediction value is equal to $E_L$, its corresponding RI value is defined to be the RI threshold ($RI_T$).

Further, in the training phase, a statistical distance model is established by using the sets of historical process data in accordance with a statistical distance algorithm, wherein the statistical distance algorithm is a Mahalanobis distance algorithm or an algorithm similar thereto. Thereafter, the sets of historical process data are inputted into the statistical distance model, thereby computing a plurality of historical global similarity indexes (GSIs). Thereafter, a GSI threshold value ($GSI_T$) is determined to be two to three times of the maximal historical GSI value.

Thereafter, in the tuning phase, at first, a set of tuning-use process data are obtained from the aforementioned production equipment, and a tuning-use actual measurement value is obtained from the aforementioned measurement equipment, wherein the tuning-use actual measurement value is the measurement value of the product which is manufactured in accordance with the set of tuning-use process data. Then, the conjecture model is adjusted by using the tuning-use process data and the tuning-use actual measurement value. And, the reference model is adjusted by using the tuning-use process data and the tuning-use actual measurement value. Further, the set of tuning-use process data is applied to tune the statistical distance model.

In the conjecture phase, at least one set of process data is obtained and inputted to the conjecture model, thereby computing at least one virtual measurement value, and the at least one set of process data is also inputted to the reference model, thereby computing at least one reference prediction value. Then, the overlap area between the statistical distribution of the at least one virtual measurement value and the statistical distribution of the at least one reference prediction value is calculated, thereby generating at least one RI. The higher the RI value is, the higher the reliance level of the virtual measurement value will be. Restated, when the RI value is greater than the $RI_T$, the virtual measurement value obtained is reliable. Further, the at least one set of process data is inputted into the statistical distance model, thereby computing at least one GSI for the at least one set of process data, wherein, when the GSI smaller than the $GSI_T$, it indicates that said at least one set of process data have ever been trained, so that the virtual measurement value corresponding to the process data is relatively accurate.

Moreover, in the method for evaluating reliance level of a virtual metrology system of the present invention, when the GSI of the set of process data is greater than the $GSI_T$, a plurality of individual similarity indexes (ISIs) of said set of process data are obtained for understanding the deviations of all of the individual parameters. The ISI of a process parameter is the standardized value (also called z score) of said process parameter. The standardization procedure is performed in terms of the mean and standard deviation of the corresponding parameter in all of the sets of historical process data.

Hence, with the application of the present invention, the reliance index (RI) of the conjecture result from the virtual metrology system can be provided for determining if the conjecture result of a set of input process data is reliable; the global similarity index (GSI) can be provided to assist in evaluating the reliance level of the virtual metrology system; and, when the GSI of the set of input process data is too large, the corresponding individual similarity indexes (ISIs) are provided for understanding the deviations of each individual parameters, thereby overcoming the disadvantages of the conventional skills.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 1:
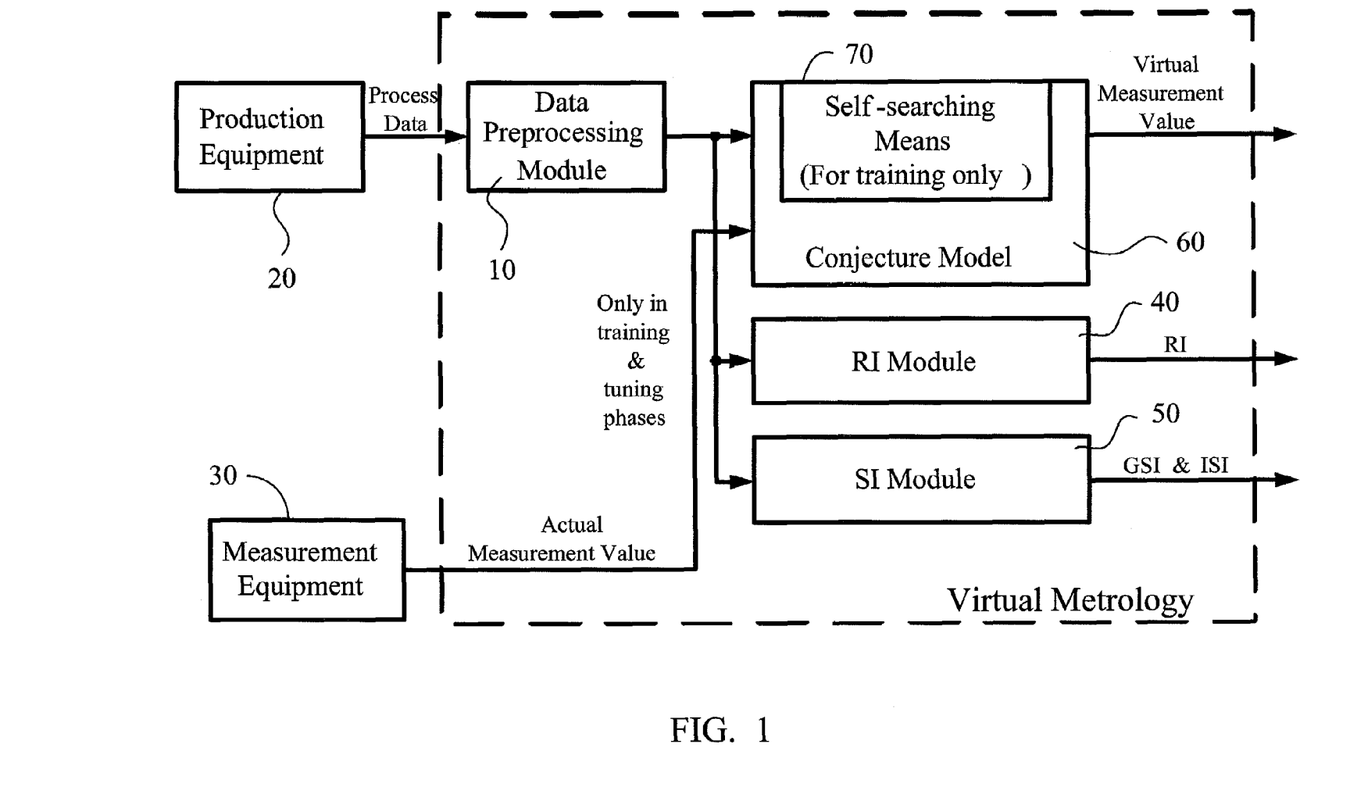
FIG. 1 is a schematic block diagram showing a virtual metrology system according to a preferred embodiment of the present invention.

Referring to FIG. 1, FIG. 1 is a schematic block diagram showing a virtual metrology system according to a preferred embodiment of the present invention. In the virtual metrology system of the present invention, a data preprocessing module 10 processes and standardizes raw process data from a piece of production equipment 20, and sifts important parameters from all of the original parameters to prevent unimportant parameters from affecting the prediction accuracy. A conjecture model 60 uses a set of process data after preprocess to conjecture the virtual measurement value of a product being manufactured. The conjecture algorithm applicable to the conjecture model 60 can be such as a multi-regression (MR) algorithm, a neural-network (NN) algorithm or a time-series algorithm, etc. When a NN algorithm is adopted, during the training phase, a self-searching means 70 is used to self-search the optimal parameters combination of the conjecture model 60. A reliance index (RI) module 40 generates the RI value to estimate the reliance level of the virtual measurement value. A similarity index (SI) module 50 calculates similarity indexes for evaluating the degree of similarity between the input-set process data and all of the sets of historical process data in the conjecture model 60 for training and building the model, wherein the similarity indexes include a global similarity index (GSI) and individual similarity indexes (ISIs) used for assisting RI in gauging the degree of reliance of the virtual metrology system.

In order to real-time monitor if the virtual measurement value is reliable, the present invention is featured in providing the RI and similarity indexes (GSI and ISIs) of the process parameters. The RI value is defined as lying between 0 and 1. To distinguish how good the RI is, an approach for calculating the RI threshold value ($RI_T$) is also provided. If the RI exceeds the $RI_T$, then the virtual measurement is reliable; otherwise, its reliability is relatively low thus the conjecture result requires further verification.

The GSI is defined as the degree of similarity between the set of process data currently inputted and all the sets of process data used in the conjecture model for training and tuning purposes. Moreover, the ISI of an individual process parameter is defined as the degree of similarity between this individual process-parameter's standardized process datum of the input set and the same process-parameter's standardized process data in all the historical sets that are used for training and tuning the conjecture model. The GSI and ISI values are utilized to assist the RI in gauging the reliance level and identifying the key process parameters that cause major deviation.

The operating procedures for the VMS comprise training, tuning and conjecture phases. The following presents the algorithms related to the RI, GSI, and ISI and explains their operating procedures.

Reliance Index (RI)

Referring to Table 1, n sets of historical data are assumed to be collected, including process data ($X_i$, i=1,2, ..., n) and the corresponding actual measurement values ($y_i$, i=1,2, ..., n), where each set of process data contains p individual parameters (from parameter 1 to parameter p), namely $X_i=[x_{i,1}, x_{i,2}, ..., x_{i,p}]^T$. Additionally, (m-n) sets of process data in actual production were also collected, but no actual measurement values are available besides $y_{n+1}$. That is, only the first among (m-n) pieces of the products is selected and actually measured. In the current manufacturing practice, the actual measurement value $y_{n+1}$ obtained is used to infer and evaluate the quality of the (m-n-1) pieces of the products.

TABLE 1

| Sample Data Set | Parameter 1 | Parameter 2 | ... | Parameter p | Actual Measurement Value |
|---|---|---|---|---|---|
| 1 | $x_{1,1}$ | $x_{1,2}$ | ... | $x_{1,p}$ | $y_1$ |
| 2 | $x_{2,1}$ | $x_{2,2}$ | ... | $x_{2,p}$ | $y_2$ |
| ... | ... | ... | ... | ... | ... |
| n | $x_{n,1}$ | $x_{n,2}$ | ... | $x_{n,p}$ | $y_n$ |
| n + 1 | $x_{n+1,1}$ | $x_{n+1,2}$ | ... | $x_{n+1,p}$ | $y_{n+1}$ |
| n + 2 | $x_{n+2,1}$ | $x_{n+2,2}$ | ... | $x_{n+2,p}$ | Zip |

TABLE 1-continued

| Sample Data Set | Parameter 1 | Parameter 2 | ... | Parameter p | Actual Measurement Value |
|---|---|---|---|---|---|
| ... | ... | ... | ... | ... | ... |
| m | $x_{m,1}$ | $x_{m,2}$ | ... | $x_{m,p}$ | Zip |

As shown in Table 1, $y_1, y_2, ..., y_n$ are historical measurement values, and $y_{n+1}$ is the actual measurement value of the first piece of the products being manufactured. Generally, a set of actual measurement values ($y_i$, i=1,2, ..., n) is a normal distribution with mean $\mu$ and standard deviation $\sigma$, namely $y_i \sim N(\mu, \sigma^2)$.

All the actual measurement values can be standardized in terms of the mean and standard deviation of the sample set ($y_i$, i=1,2, ..., n). Their standardized values (also called z scores) $Z_{y_1}, Z_{y_2}, ..., Z_{y_n}$ are thus derived, where each z score has mean zero and standard deviation one, namely $Z_{y_i} \sim N(0, 1)$. Regarding the actual measurement data, a corresponding $Z_{y_i}$ close to 0 indicates that the actual measurement value approaches the central value of the specification. The equations for standardization are listed as follows:

$$Z_{y_i} = \frac{y_i - \bar{y}}{\sigma_y}, i = 1, 2, ..., n \quad (1)$$

$$\bar{y} = \frac{1}{n}(y_1 + y_2 + ... + y_n) \quad (2)$$

$$\sigma_y = \sqrt{\frac{1}{n-1}[(y_1 - \bar{y})^2 + (y_2 - \bar{y})^2 + ... + (y_n - \bar{y})^2]} \quad (3)$$

wherein $y_i$ is the i-th actual measurement value,
  $Z_{y_i}$ is the standardized i-th actual measurement value,
  $\bar{y}$ is the mean of all the actual measurement values, and
  $\sigma_y$ is the standard deviation of all the actual measurement values.

The explanation herein adopts a neural-network (NN) algorithm as the conjecture algorithm for establishing the conjecture model performing virtual measurement, and uses such as a multi-regression (MR) algorithm to be the reference algorithm for establishing the reference model that serves as a comparison base for the conjecture model. However, the present invention can also apply other algorithms to be the conjecture algorithm or the reference algorithm, provided the reference algorithm differs from the conjecture algorithm, such as a time series algorithm and other related algorithms, and thus the present invention is not limited thereto.

When the NN and MR algorithms are utilized, if their convergence conditions both are that SSE (Sum of Square Error) is minimized with $n \to \infty$, their standardized predictive measurement values (defined as $Z_{y_{Ni}}$ and $Z_{y_{ri}}$ respectively) should be the same as the standardized actual measurement value $Z_{y_i}$. Restated, when $n \to \infty$, $Z_{y_i} = Z_{y_{Ni}} = Z_{y_{ri}}$ all represent the standardized actual measurement value, but they have different names due to having different purposes and different estimating models. Hence, $Z_{y_{Ni}} \sim N(\mu_{Z_{y_i}}, \sigma_{Z_y}^2)$ and $Z_{y_{ri}} \sim N(\mu_{Z_{y_i}}, \sigma_{Z_y}^2)$ indicate that $Z_{y_{Ni}}$ and $Z_{y_{ri}}$ share the same statistical distribution. However, owing to the existence of different estimating models, the estimations of mean and standard deviation differ between those two prediction algorithms. Namely the standardized mean-estimating equation ($\hat{\mu}_{Z_{y_i}} = Z_{\hat{y}_{Ni}}$) and standard-deviation-estimating equation ($\hat{\sigma}_{Z_y} = \hat{\sigma}_{Z_{\hat{y}_N}}$) with respect to the NN conjecture model differ from the standardized mean-estimating equation ($\hat{\mu}_{Z_{yi}}=Z_{\hat{y}_{Ni}}$) and standard-deviation-estimating equation ($\hat{\sigma}_{Z_y}=\hat{\sigma}_{Z_{\hat{y}r}}$) with respect to the MR reference model.

The RI is designed to gauge the reliance level of the virtual measurement value. The RI thus should consider the degree of similarity between the statistical distribution $Z_{\hat{y}_{Ni}}$ of the virtual measurement value and the statistical distribution $Z_{y_i}$ of the actual measurement value. However, when virtual metrology is applied, no actual measurement value can be used to verify the trustworthiness of the virtual measurement value. (Notably, virtual metrology becomes unnecessary if actual measurement values are obtained.) Instead, the present invention adopts the statistical distribution $Z_{\hat{y}_{ri}}$ estimated by the reference algorithm which is such as the MR algorithm to replace $Z_{y_i}$. The reference algorithm also can be such as a time-series algorithm and other related algorithms, and thus the present invention is not limited thereto.

Figure 2:
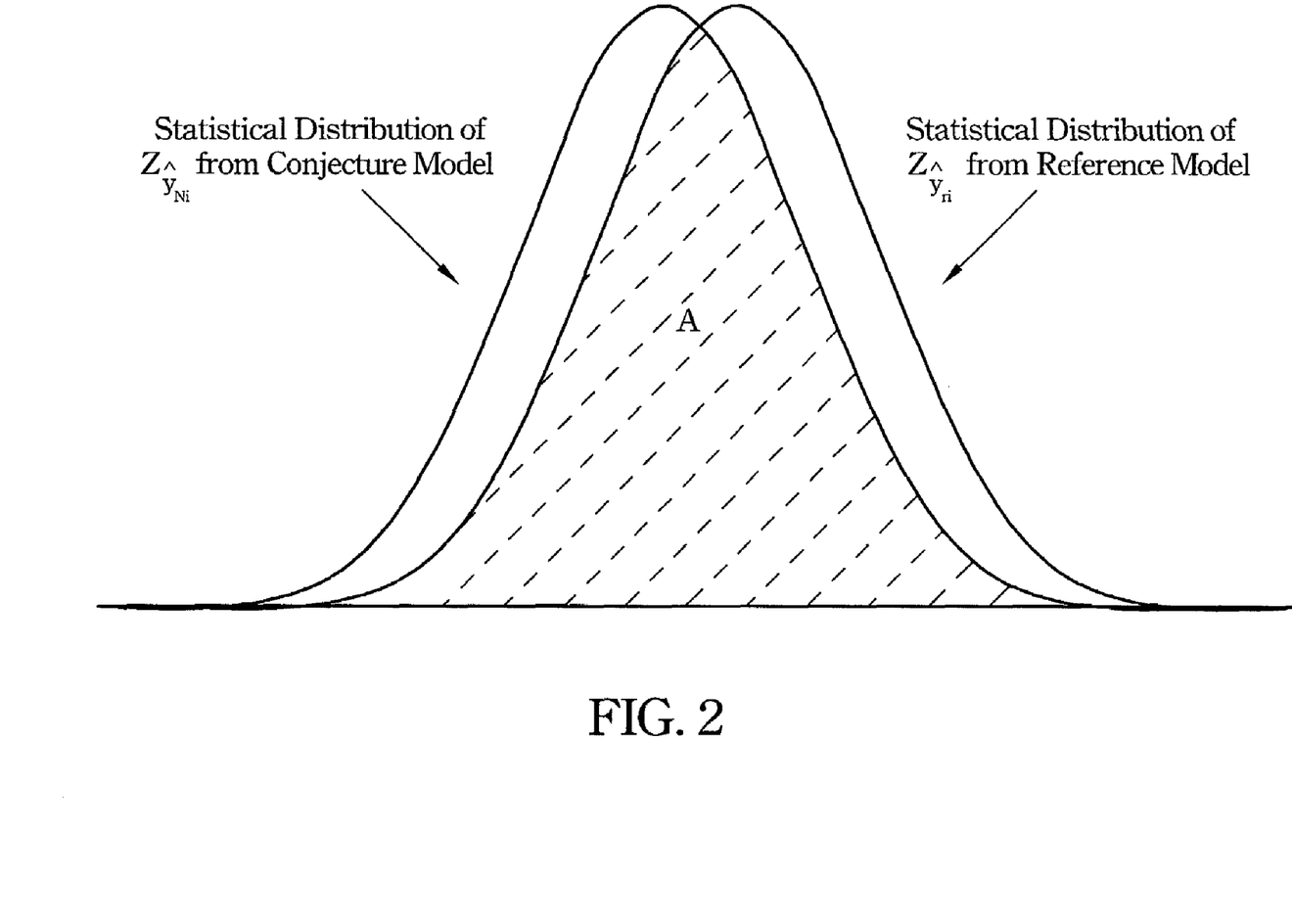
FIG. 2 is a schematic diagram for defining the reliance index (RI) according to the preferred embodiment of the present invention.

Referring to FIG. 2, FIG. 2 is a schematic diagram for explaining the reliance index (RI) according to the preferred embodiment of the present invention. The RI of the present invention is defined as the intersection-area value (overlap area A) between the statistical distribution $Z_{\hat{y}_{Ni}}$ of the virtual measurement value from the conjecture model (built by such as the NN algorithm) and the statistical distribution $Z_{\hat{y}_{ri}}$ of the reference prediction value from the reference model (built by such as the MR algorithm). As such, the RI equation is listed below:

$$RI = 2\int_{\frac{Z_{\hat{y}_{Ni}}+Z_{\hat{y}_{ri}}}{2}}^{\infty} \frac{1}{\sqrt{2\pi}\,\sigma} e^{-\frac{1}{2}\left(\frac{x-\mu}{\sigma}\right)^2} dx \quad (4)$$

with
$\mu = Z_{\hat{y}_{Ni}}$ if $Z_{\hat{y}_{Ni}} < Z_{\hat{y}_{ri}}$
$\mu = Z_{\hat{y}_{ri}}$ if $Z_{\hat{y}_{ri}} < Z_{\hat{y}_{Ni}}$ and $\sigma$ is set to be 1.

The RI increases with increasing overlap area A. This phenomenon indicates that the result obtained using the conjecture model is closer to that obtained from the reference model, and thus the corresponding virtual measurement value is more reliable. Otherwise, the reliability of the corresponding measurement value reduces with decreasing RI. When the distribution $Z_{\hat{y}_{Ni}}$ estimated from $Z_{y_{Ni}}$ is fully overlapped with the distribution $Z_{\hat{y}_{ri}}$ estimated from $Z_{y_{ri}}$, then according to the distribution theory of statistics, the RI value equals 1; and, when those two distributions are almost separate, the RI value approaches 0.

Hereinafter, the method for calculating the statistical distribution of the virtual measurement values ($Z_{\hat{y}_{Ni}}$ and $\hat{\sigma}_{Z_{\hat{y}N}}$) from the conjecture model is explained.

In the NN conjecture model, if the convergence condition is to minimize SSE, then it can be assumed that "for given $Z_{x_{i,j}}$, $Z_{y_{Ni}}$ is the distribution with mean $\mu_{Z_{yi}}$ and standard deviation $\sigma_{Z_y}$", namely for given $Z_{x_{i,j}}$, $Z_{y_{Ni}} \sim N(\mu_{Z_{yi}}, \sigma_{Z_y}^2)$, where the NN estimating equation of $\mu_{Z_{yi}}$ is $\hat{\mu}_{Z_{yi}}=Z_{\hat{y}_{Ni}}$, and the NN estimating equation of $\sigma_{Z_y}^2$ is $\hat{\sigma}_{Z_y}^2=\hat{\sigma}_{Z_{\hat{y}N}}^2$.

Before the NN conjecture model is constructed, the process data must be standardized. The equations for standardizing the process data are presented below:

$$Z_{x_{i,j}} = \frac{x_{i,j} - \bar{x}_j}{\sigma_{x_j}}, i = 1, 2, \ldots, \quad (5)$$

$$n, n+1, \ldots, m; j = 1, 2, \ldots, p$$

$$\bar{x}_j = \frac{1}{n}(x_{1,j} + x_{2,j} + \ldots + x_{n,j}) \quad (6)$$

$$\sigma_{x_j} = \sqrt{\frac{1}{n-1}[(x_{1,j} - \bar{x}_j)^2 + (x_{2,j} - \bar{x}_j)^2 + \ldots + (x_{n,j} - \bar{x}_j)^2]} \quad (7)$$

wherein $x_{i,j}$ is the j-th process parameter in the i-th set of process data, $Z_{x_{i,j}}$ is the standardized j-th process parameter in the i-th set of process data;

$\bar{x}_j$ is the mean of the j-th process data;

$\sigma_{x_j}$ is the standard deviation of the j-th process data.

The n sets of standardized process data ($Z_{x_{i,j}}$, i=1,2, . . . ,n; j=1,2, . . . , p) and the n standardized actual measurement values ($Z_{y_i}$, i=1,2, . . . ,n) are utilized to build the NN conjecture model. The m sets of standardized process data ($Z_{x_{i,j}}$, i=1,2, . . . ,m; j=1,2, . . . ,p) are then inputted into the NN conjecture model to obtain the corresponding standardized virtual measurement values: $Z_{\hat{y}_{N1}}, Z_{\hat{y}_{N2}}, \ldots, Z_{\hat{y}_{Nn}}, Z_{\hat{y}_{Nn+1}}, \ldots, Z_{\hat{y}_{Nm}}$.

Accordingly, the estimated value of $\mu_{Z_{yi}}$ (i.e. $\hat{\mu}_{Z_{yi}}=Z_{\hat{y}_{Ni}}$) and the estimated value of $\sigma_{Z_y}$ (i.e. $\hat{\sigma}_{Z_y}=\hat{\sigma}_{Z_{\hat{y}N}}$) can be computed as follows:

$$\hat{\mu}_{Z_{yi}} = Z_{\hat{y}_{Ni}}, i = 1, 2, \ldots, n, n+1, \ldots, m \quad (8)$$

$$\hat{\sigma}_{Z_{\hat{y}N}} = \sqrt{\frac{1}{n-1}\left[\left(Z_{\hat{y}_{N_1}} - \bar{Z}_{\hat{y}_N}\right)^2 + \left(Z_{\hat{y}_{N_2}} - \bar{Z}_{\hat{y}_N}\right)^2 + \ldots + \left(Z_{\hat{y}_{N_n}} - \bar{Z}_{\hat{y}_N}\right)^2\right]} \quad (9)$$

$$\bar{Z}_{\hat{y}_N} = \frac{1}{n}\left(Z_{\hat{y}_{N_1}} + Z_{\hat{y}_{N_2}} + \ldots + Z_{\hat{y}_{N_n}}\right) \quad (10)$$

wherein $\bar{Z}_{\hat{y}_N}$ is the mean of the standardized virtual measurement values.

Hereinafter, the method for calculating the reference predication values ($Z_{\hat{y}_{ri}}$ and $\hat{\sigma}_{Z_{\hat{y}r}}$) from the MR model is explained.

The basic assumption of the MR is that "for given $Z_{x_{i,j}}$, $Z_{y_{ri}}$ is the distribution with mean $\mu_{Z_{yi}}$ and standard deviation $\sigma_{Z_y}$", namely for given $Z_{x_{i,j}}$, $Z_{y_{ri}} \sim N(\mu_{Z_{yi}}, \sigma_{Z_y}^2)$, wherein the MR estimating equation of $\mu_{Z_{yi}}$ is $\hat{\mu}_{Z_{yi}}=Z_{\hat{y}_{ri}}$, and the MR estimating equation of $\sigma_{Z_y}^2$ is $\hat{\sigma}_{Z_y}^2=\hat{\sigma}_{Z_{\hat{y}r}}^2$.

To obtain the MR relationship between the n sets of standardized process data ($Z_{x_{i,j}}$, i=1,2, . . . , n; j=1,2, . . . , p) and the n standardized actual measurement values, ($Z_{y_i}$, i=1,2, . . . , n), the weighting factors $\beta_r=[\beta_{r0}, \beta_{r1}, \beta_{r2}, \ldots, \beta_{rp}]^T$ corresponding to those p parameters must be defined by using the MR analysis. The relationship between $Z_{y_i}$ and $Z_{x_{i,j}}$ thus is constructed as follows:

$$\beta_{r0} + \beta_{r1}Z_{x_{1,1}} + \beta_{r2}Z_{x_{1,2}} + \ldots + \beta_{rp}Z_{x_{1,p}} = Z_{y_1} \quad (11)$$
$$\beta_{r0} + \beta_{r1}Z_{x_{2,1}} + \beta_{r2}Z_{x_{2,2}} + \ldots + \beta_{rp}Z_{x_{2,p}} = Z_{y_2}$$
$$\ldots$$
$$\beta_{r0} + \beta_{r1}Z_{x_{n,1}} + \beta_{r2}Z_{x_{n,2}} + \ldots + \beta_{rp}Z_{x_{n,p}} = Z_{y_n}$$

Let $$Z_y = \begin{pmatrix} Z_{y_1} \\ Z_{y_2} \\ \vdots \\ Z_{y_n} \end{pmatrix} \quad (12)$$

and $$Z_x = \begin{pmatrix} 1 & Z_{x_{1,1}} & \cdots & Z_{x_{1,p}} \\ 1 & Z_{x_{2,1}} & \cdots & Z_{x_{2,p}} \\ \vdots & \vdots & \ddots & \vdots \\ 1 & Z_{x_{n,1}} & \cdots & Z_{x_{n,p}} \end{pmatrix} \quad (13)$$

The least square method can obtain the estimating equation of $\beta_r$, $\hat{\beta}_r = [\hat{\beta}_{r0}, \hat{\beta}_{r1}, \ldots \hat{\beta}_{rp}]^T$ as $$\hat{\beta}_r = (Z_x^T Z_x)^{-1} Z_x^T Z_y \quad (14)$$

Therefore, the MR reference model can be obtained as $$Z_{\hat{y}_{ri}} = \hat{\beta}_{r0} + \hat{\beta}_{r1} Z_{x_{i,1}} + \hat{\beta}_{r2} Z_{x_{i,2}} + \ldots + \hat{\beta}_{rp} Z_{x_{i,p}}$$
$$i = 1, 2, \ldots, n, n+1, \ldots, m \quad (15)$$

Hence, during the conjecture phase, after inputting a set of process data, its MR estimating value $Z_{\hat{y}_{ri}}$ corresponding thereto can be obtained via equation (15). The MR estimating equation of the standard deviation $\sigma_{Z_y}$ is $\hat{\sigma}_{Z_{\hat{y}_r}}$ with $$\hat{\sigma}_{Z_{\hat{y}_r}} = \sqrt{\frac{1}{n-1}\left[(Z_{\hat{y}_{r1}} - \overline{Z}_{\hat{y}_r})^2 + (Z_{\hat{y}_{r2}} - \overline{Z}_{\hat{y}_r})^2 + \ldots + (Z_{\hat{y}_{rn}} - \overline{Z}_{\hat{y}_r})^2\right]} \quad (16)$$

$$\overline{Z}_{\hat{y}_r} = \frac{1}{n}(Z_{\hat{y}_{r1}} + Z_{\hat{y}_{r2}} + \ldots + Z_{\hat{y}_{rn}}) \quad (17)$$

After obtaining the NN estimating equations ($Z_{\hat{y}_{Ni}}$ and $\hat{\sigma}_{Z_{\hat{y}_N}}$) and the MR estimating equations ($Z_{\hat{y}_{ri}}$ and $\hat{\sigma}_{Z_{\hat{y}_r}}$), their normal distribution curves can be depicted, as illustrated in FIG. 2. Thus, the RI of each virtual measurement value can be derived by calculating the intersection area value (overlap area A).

After obtaining the RI, the RI threshold value ($RI_T$) must be defined. If $RI > RI_T$, then the reliance level of the virtual measurement value is acceptable. A systematic approach for determining the $RI_T$ is described below.

Before determining the $RI_T$, it is necessary to define a maximal tolerable error limit ($E_L$). The error of the virtual measurement value is an absolute percentage of the difference between the actual measurement value $y_i$ and $\hat{y}_{Ni}$ obtained from the NN conjecture model divided by the mean of all the actual measurement values, $\overline{y}$, namely $$Error_i = \left|\frac{y_i - \hat{y}_{Ni}}{\overline{y}}\right| \times 100\% \quad (18)$$

Figure 3:
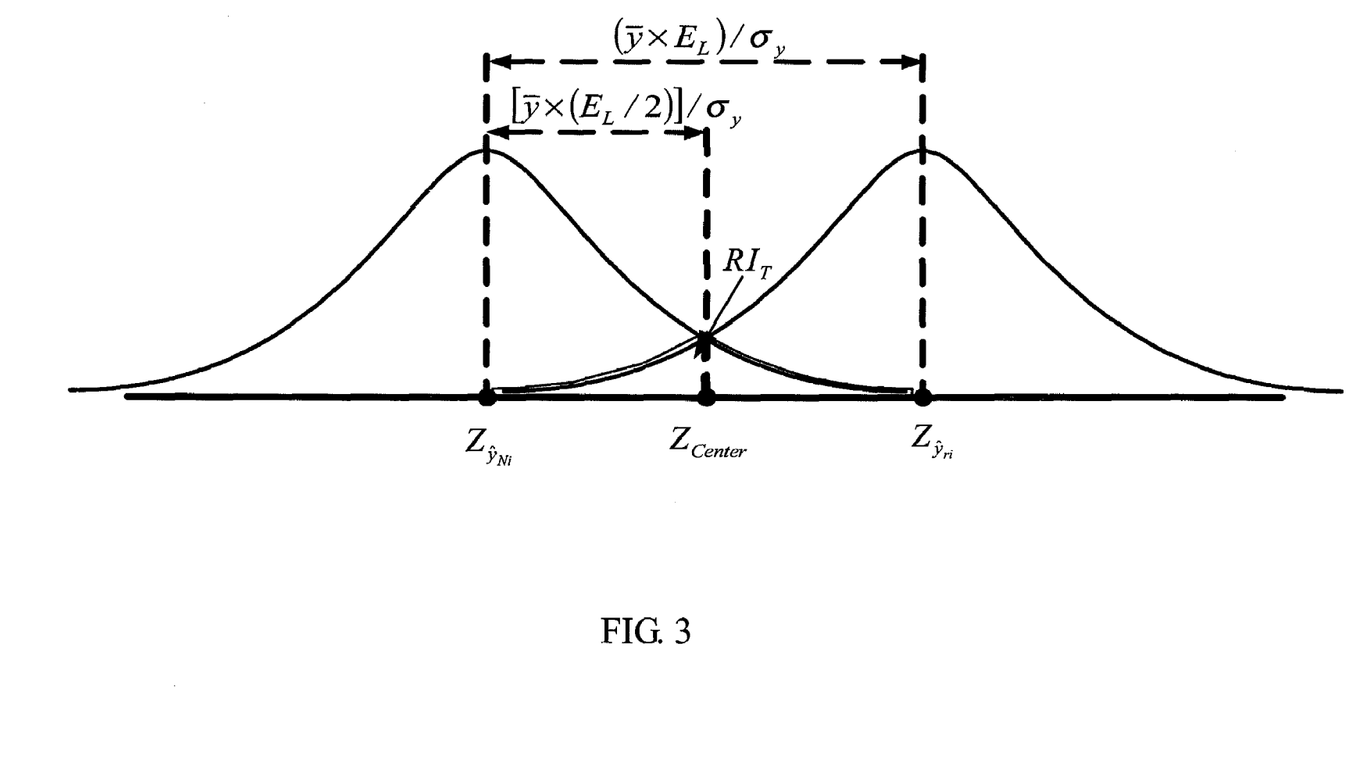
FIG. 3 is a schematic diagram for defining the RI threshold ($RI_T$) according to the preferred embodiment of the present invention.

The $E_L$ can then be specified based on the error defined in equation (18) and the accuracy specification of virtual metrology (VM). Consequently, $RI_T$ is defined as the RI value corresponding to the $E_L$, as shown in FIG. 3. That is $$RI_T = 2\int_{Z_{Center}}^{\infty} \frac{1}{\sqrt{2\pi}\,\sigma} e^{-\frac{1}{2}\left(\frac{x-\mu}{\sigma}\right)^2} dx \quad (19)$$

with $\mu$ and $\sigma$ defined in equation (4) and $$Z_{Center} = Z_{\hat{y}_{Ni}} + [\overline{y} \times (E_L/2)]/\sigma_y \quad (20)$$

where $\sigma_y$ is specified in equation (3).

Similarity Indexes (SIs)

As mentioned above, when virtual metrology is applied, no actual measurement value is available to verify the accuracy of the virtual measurement value. Therefore, instead of the standardized actual measurement value $Z_{y_i}$, the standardized MR prediction value $Z_{\hat{y}_{ri}}$ is adopted to calculate the RI. This substitution may cause inevitable gauging errors in the RI. To compensate for this unavoidable substitution, the similarity indexes (SIs), including a global similarity index (GSI) and an individual similarity index (ISI), are provided to help the RI gauge the reliance level of virtual metrology and identifying the key process parameters with large deviations (z score values).

The GSI assesses the degree of similarity between any set of process data and the model set of process data. This model set is derived from all of the sets of historical process data used for building the conjecture model.

The present invention may utilize a statistical distance measure, such as Mahalanobis distance, to quantify the degree of similarity. Mahalanobis distance is a distance measure introduced by P.C. Mahalanobis in 1936. This measure is based on correlation between variables to identify and analyze different patterns of sample sets. Mahalanobis distance is a useful way of determining similarity of an unknown sample set to a known one. This method considers the correlation of the data set and is scale-invariant, namely it is not dependent on the scale of measurements. If the data set has high similarity, the calculated Mahalanobis distance calculated will be relatively small.

The present invention uses the calculated GSI (i.e. Mahalanobis distance) size to determine whether the newly input set of process data is similar to the model set of process data. If the calculated GSI is small, the newly input set is relatively similar to the model set. Thus the virtual measurement value of the newly input (high-similarity) set is relatively accurate. On the contrary, if the calculated GSI is too large, the newly input set is somewhat different from the model set. Consequently, the virtual measurement value estimated in accordance with the newly input (low-similarity) set has low reliance level in terms of accuracy.

The equations to calculate the standardized process data $Z_{x_{i,j}}$ of the conjecture model are shown in equations (5), (6) and (7). At first, the model set of the process parameters is defined as $X_M = [x_{M,1}, x_{M,2}, \ldots, x_{M,p}]^T$, where $x_{M,j}$ equals $\overline{x}_j$, $j = 1, 2, \ldots, p$, so that each element in the model set after standardization (also denoted as the standardized model parameter, $Z_{M,j}$) has a value of 0. Restated, all of the elements in $Z_M = [Z_{M,1}, Z_{M,2}, \ldots, Z_{M,p}]^T$ are 0. Thereafter, the correlation coefficients between the standardized model parameters are calculated.

Assuming that the correlation coefficient between the s-th parameter and the t-th parameter is $r_{st}$ and that there are k sets of data, then $$r_{st} = \frac{1}{k-1}\sum_{l=1}^{k} z_{sl} \cdot z_{tl} \qquad (21)$$

$$= \frac{1}{k-1}(z_{s1} \cdot z_{t1} + z_{s2} \cdot z_{t2} + \ldots + z_{sk} \cdot z_{tk})$$

After calculating the correlation coefficients between the standardized model parameters, the matrix of correlation coefficients can be obtained as $$R = \begin{bmatrix} 1 & r_{12} & \cdots & r_{1p} \\ r_{21} & 1 & \cdots & r_{2p} \\ \vdots & \vdots & \ddots & \vdots \\ r_{p1} & r_{p2} & \cdots & 1 \end{bmatrix} \qquad (22)$$

Assuming that the inverse matrix ($R^{-1}$) of R is defined as A, then $$A = R^{-1} = \begin{bmatrix} a_{11} & a_{12} & \cdots & a_{1p} \\ a_{21} & a_{22} & \cdots & a_{2p} \\ \cdots & \cdots & \cdots & \cdots \\ a_{p1} & a_{p2} & \cdots & a_{pp} \end{bmatrix} \qquad (23)$$

Hence, the equation for calculating the Mahalanobis distance ($D_\lambda^2$) between the standardized λ-th set process data ($Z_\lambda$) and the standardized model set process data ($Z_M$) is as follows.

$$D_\lambda^2 = (Z_\lambda - Z_M)^T R^{-1}(Z_\lambda - Z_M) \qquad (24)$$

$$= Z_\lambda^T R^{-1} Z_\lambda$$

Finally, we have $$D_\lambda^2 = \sum_{j=1}^{p}\sum_{i=1}^{p} a_{ij} z_{i\lambda} z_{j\lambda} \qquad (25)$$

The Mahalanobis distance ($D_\lambda^2$) expressed in equation (25) is the GSI of the standardized λ-th set process data.

After obtaining the GSI, the GSI threshold ($GSI_T$) should be defined. Generally, the default $GSI_T$ is assigned to be two to three times the maximal $GSI_a$ (the subscript "a" stands for each historical set during the training phase).

Furthermore, when the GSI corresponding to a certain set of process data is too large, individual similarity indexes (ISIs) of all of the parameters in the set must be analyzed to identify the parameters that cause this dissimilarity. The explanation for obtaining the ISIs of the standardized λ-th set process data, $Z_{\lambda,j}$, j=1,2, ..., p, are as follows.

In fact, the λ-th $ISI_j$, j=1,2, ..., p are $Z_{\lambda,j}$, j=1,2, ..., p themselves. If $Z_{\lambda,j}$ is near zero, this individual parameter is quite similar to the corresponding model parameter $Z_{M,j}$ (=0). Therefore, the $ISI_j$, defined as $Z_{\lambda,j}$, is near zero. Meanwhile, if $Z_{\lambda,j}$ is much larger than three, then $Z_{\lambda,j}$ differs significantly from the corresponding standardized model parameter, $Z_{M,j}$. Consequently, dissimilarity may occur and the corresponding $ISI_j(=Z_{\lambda,j})$ significantly exceeds three. A Pareto chart of ISIs can be applied to display the dissimilarity tendency. After presenting the algorithms related to the RI, GSI and ISI, the operating procedure of the virtual metrology system of the present invention is explained below.

Figure 4:
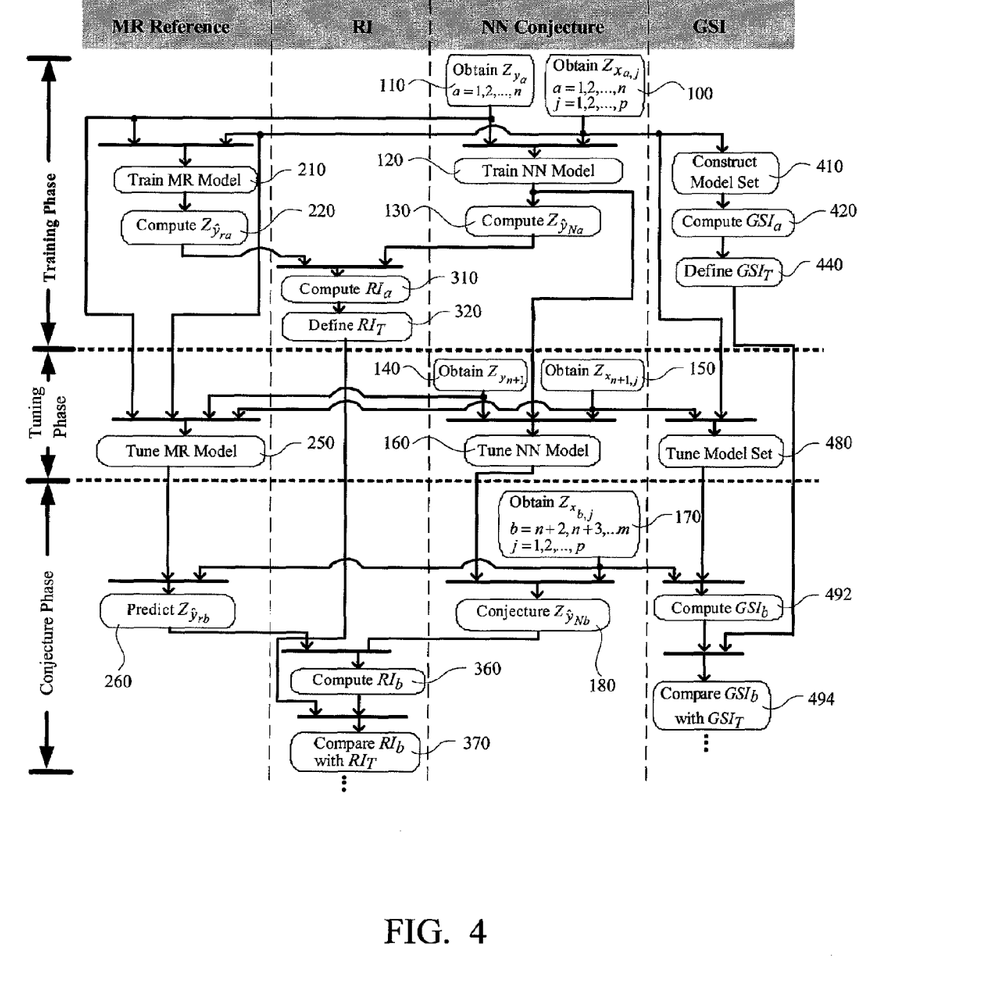
FIG. 4 is a schematic activity diagram showing the operation of the virtual metrology system according to the preferred embodiment of the present invention.

Referring to FIG. 4, FIG. 4 is a schematic activity diagram showing the operating procedures of the virtual metrology system according to the preferred embodiment of the present invention. The operating procedures are divided into training, tuning, and conjecture phases, each comprising four parts: NN conjecture, MR reference, RI, and GSI, wherein the NN conjecture part is executed in the conjecture model 60 as shown in FIG. 1; the MR reference part and the RI part are executed in the RI module 40 as shown in FIG. 1; and the GSI part is executed in the SI module 50 as shown in FIG. 1, respectively.

Hereinafter, the steps for constructing each part during the training phase are explained below.

NN Conjecture Part in Training Phase

First, the standardized historical process data ($Z_{X_{a,j}}$, a=1, 2, ..., n; j=1,2, ..., p) and the standardized historical actual measurement values, ($Z_{y_a}$, a=1,2, ..., n), are obtained (steps 100 and 110). These historical data and values are then applied to train the NN conjecture model (step 120). After constructing the NN model, the NN conjecture values ($Z_{\hat{y}_{Na}}$, a=1,2, ..., n) are computed (step 130).

MR Reference Part in Training Phase

Both $Z_{X_{a,j}}$ and $Z_{y_a}$, (a=1,2, ..., n; j=1,2, ..., p) are also utilized to train the MR reference model (step 210). Subsequently, the MR prediction values ($Z_{\hat{y}_{ra}}$, a=1,2, ..., n) are also computed (step 220).

RI Part in Training Phase

After obtaining $Z_{\hat{y}_{Na}}$ and $Z\hat{y}_{ra}$, $RI_a$ can be calculated (step 310). Then, the $RI_T$ can be defined based on the maximal error limit ($E_L$) (step 320).

GSI Part in Training Phase

The model set of all of the sample sets of historical process data is constructed first (step 410). Next, the historical $GSI_a$, a=1,2, ..., n are computed (step 420). By observing all of the historical $GSI_a$, the $GSI_T$ can then be assigned (step 440). Generally, the default $GSI_T$ is set to be two to three times the maximal $GSI_a$.

Hereinafter, the steps for constructing each part in the tuning phase are explained.

Production equipment is a time-varying system, and Its property will drift or shift over time. Execution of maintenance or part-replacement may also alter the properties of the production equipment. To remedy the problem of property-drift, the conjecture and reference models should be tuned by a fresh actual measurement sample. In general, the set of tuning-use process data is adopted after the sets of historical process data, and before the at least one set of process data desired to be conjectured. For example, to accurately conjecture the quality data of 25 pieces of wafers in a semiconductor cassette, the quality datum of at least one wafer in the cassette should be actually measured and used as the sample for tuning the conjecture and reference models. The tuning phase also comprises four parts: NN conjecture, MR reference, RI and GSI as described below.

NN Conjecture Part in Tuning Phase

The tuning-use ((n+1)-th) data set including standardized process data ($Z_{x_{n+1,j}}$, j=1,2, ..., p) and actual measurement value ($Z_{y_{n+1}}$) are first obtained (steps 150 and 140). Then, the NN conjecture model is tuned by applying this tuning-use data set (step 160).

MR Reference Part in Tuning Phase

The standardized historical data sets including $Z_{x_{a,j}}$, (a=1, 2, ..., n; j=1,2, ..., p) and $Z_{y_a}$, (a=1,2, ..., n) as well as the tuning-use data set including ($Z_{x_{n+1,j}}$, j=1,2, ..., p) and ($Z_{y_{n+1}}$) are utilized to tune the MR reference model (step 250).

RI Part in Tuning Phase

No activity occurs in this RI part.

GSI Part in Tuning Phase

The tuning-use ((n+1)-th) set standardized process data ($Z_{x_{n+1,j}}$, j=1,2, ..., p) are added to the training-use historical set standardized process data ($Z_{x_{a,j}}$, a=1,2, ..., n; j=1,2, ..., p) to re-compute (tune) the model set such as the statistical distance model (step 480). After finishing the tuning phase, the conjecture phase begins.

Hereinafter, the steps for constructing each part in the conjecture phase are explained.

NN Conjecture Part in Conjecture Phase

The current input sets standardized process data ($Z_{x_{b,j}}$, b=n+2, n+3, ..., m; j=1,2, ..., p) are obtained (step 170) to serve as inputs to the NN conjecture model after tuning, and thus the standardized virtual measurement values ($Z_{\hat{y}_{Nb}}$, b=n+2, n+3, ..., m) are conjectured (step 180).

MR Reference Part in Conjecture Phase

Similary ($Z_{x_{b,j}}$, b=n+2, n+3, ..., m; j=1,2, ..., p) are applied as inputs to the MR reference model after tuning to predict $Z_{\hat{y}_{rb}}$ (b=n+2, n+3, ..., m) (step 260).

Figure 5:
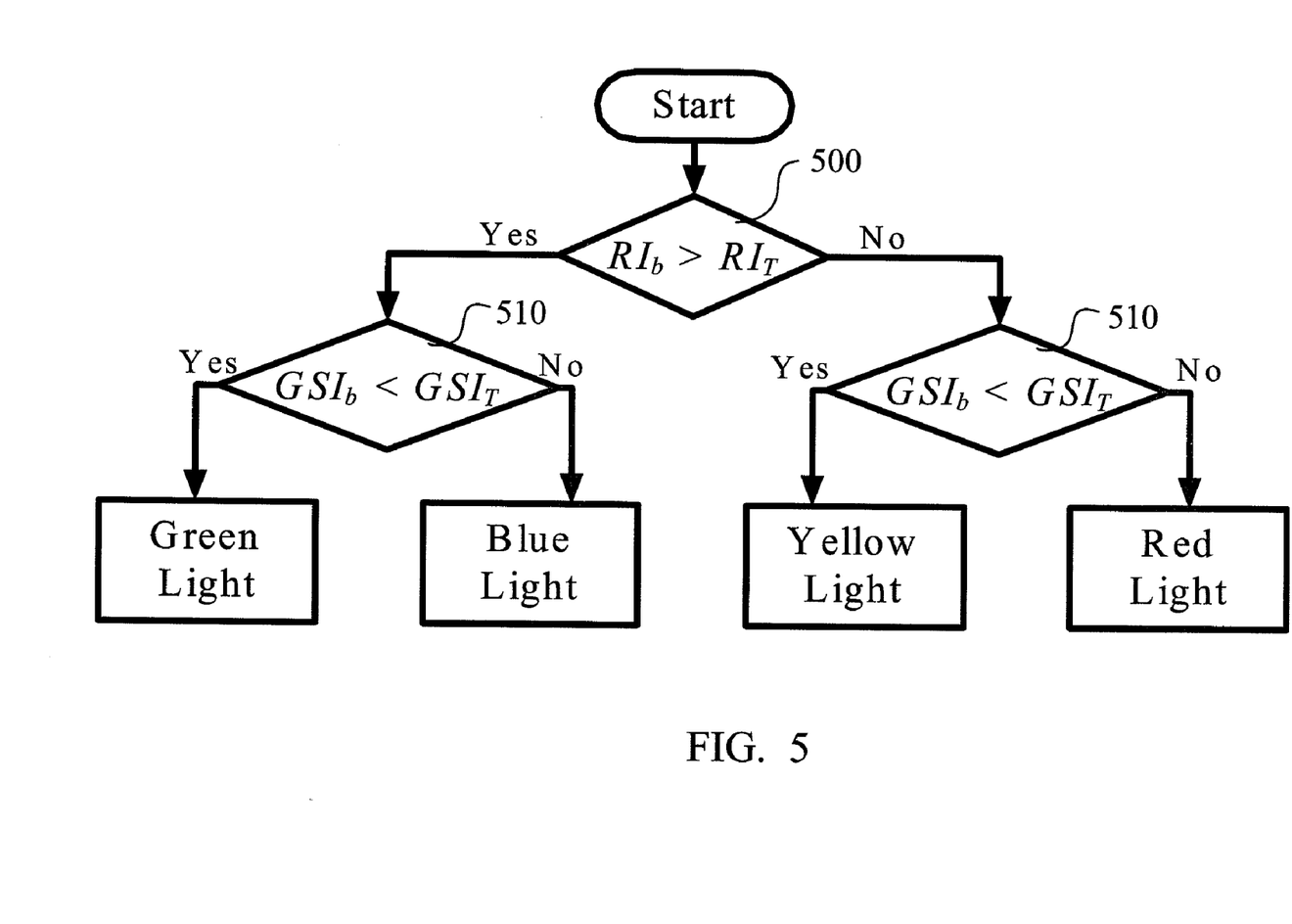
FIG. 5 is a schematic flow diagram showing the application of the reliance index (RI) and the global similarity index (GSI) according to the present invention.

RI Part in Conjecture Phase $RI_b$ (b=n+2, n+3, ..., m) are then calculated based on $Z_{\hat{y}_{Nb}}$ and $Z_{\hat{y}_{rb}}$ (step 360). Also, each $RI_b$ is compared with the $RI_T$ defined in the training phase (step 370). The comparison result is adopted as one of the inputs in FIG. 5, wherein FIG. 5 is a schematic flow diagram showing the application of the RI and GSI according to the present invention.

GSI Part in Conjecture Phase $Z_{x_{b,j}}$ (b=n+2, n+3, ..., m; j=1,2, ..., p) are utilized to compute the $GSI_b$ (b=n+2, n+3, ..., m) with respect to the tuned model set (step 492). Each $GSI_b$ is then compared with the $GSI_T$ defined during the training phase (step 494). The result of the comparison is then used as one of the inputs in FIG. 5, wherein FIG. 5 is a schematic flow diagram showing the application of the RI and GSI according to the present invention.

After obtaining the $RI_b$ and $GSI_b$, as well as their corresponding $RI_T$ and $GSI_T$, the present invention further provides a method for using these indexes with proper light displays, thereby conveniently allowing a user to evaluate in real time the reliance level of the conjecture result from the virtual metrology system. At first, step 500 is performed to determine if the $RI_b$ is greater than the $RI_T$, and then step 510 is performed to determine if the $GSI_b$ is smaller than the $GSI_T$.

If the results of both step 500 and step 510 are true (i.e. $RI_b>RI_T$ and $GSI_b<GSI_T$), then a green light is shown, thereby indicating that the NN conjecture and the MR prediction results are quite similar, and the degree of similarity between the set of process data newly entered and the sets of historical process data used for model-building is high, confirming strong confidence in the virtual measurement value.

If the result of step 500 is true and the result of step 510 is false (i.e. $RI_b>RI_T$ and $GSI_b \geqq GSI_T$), then a blue light is shown, thereby indicating that, although the virtual metrology system provided a conjecture result, some deviations may occur in the process data owing to the high $GSI_b$. Accordingly, the process data with high ISI values must be examined to prevent excessive confidence.

If the result of step 500 is false and the result of step 510 is true (i.e. $RI_b \leqq RI_T$ and $GSI_b<GSI_T$), then a yellow light is displayed, thereby meaning that the virtual measurement value may be inaccurate. However, since the $GSI_b$ is low, which implies a high degree of similarity (between the set of process data newly entered and the sets of historical process data used for model-building), the situation may result from bad MR prediction.

If the results of both step 500 and step 510 are false (i.e. $RI_b \leqq RI_T$ and $GSI_b \geqq GSI_T$), then a red light is displayed, thereby indicating a large deviation between the NN conjecture result and the MR prediction result. Moreover, the $GSI_b$ is associated with a low degree of similarity (between the set of process data newly entered and the sets of historical process data used for model-building). As such, it is confirmed that the virtual measurement value is unreliable. In this case, the parameter(s) with the greatest deviation can be identified from the corresponding ISI Pareto chart.

Hereinafter, an illustrative example is presented for explaining the applications of RI, GSI, and ISI of the present invention to the virtual metrology system.

The present illustrative example, with the process of production, involves 125 sets of equipment sample data (process data; $X_i$, i=1,2, ..., 125). The first 101 sets of process data have their corresponding actual measurement values ($y_i$, i=1, 2, ..., 101). Notably, the $102^{th}$ to $125^{th}$ sets of process data are related to the products currently being manufactured, hence their actual measurement values ($y_{102}$ to $y_{125}$) thereof do not exist, and instead their virtual measurement values thereof are required. According to the physical properties of semiconductor equipment and the experience of equipment engineers, 24 significant process parameters are selected as inputs to the NN conjecture model. Among the 125 sets process data and 101 actual measurement values the first 100 sets of historical process data and 100 historical actual measurement values are adopted as the training data for building the NN conjecture model. The final 25 ($101^{th}$ to $125^{th}$) sets of process data belong to 25 wafers contained in the same cassette, wherein the first wafer ($101^{th}$) thereof is usually the sample product whose quality datum is measured for the purpose of monitoring the quality of the whole cassette. Consequently, this ($101^{th}$) set of process data and the actual measurement value can be used as the data for tuning purposes. Thereafter, the other 24 ($102^{th}$ to $125^{th}$) sets of process data of the cassette are used for performing virtual measurement. As such, in this illustrative example, n=100; m=125; p=24; a=1, 2, ..., 100; and b=101, 102, ..., 125.

Following the operating procedure shown in FIGS. 4 and 5, the results of the illustrative example are presented as follows. Referring to FIG. 6A to FIG. 6C and FIG. 7, FIG. 6A is a schematic diagram showing the results of virtual measurement values and actual measurement values according to the illustrative example of the present invention; FIG. 6B is a schematic diagram showing the results of RIs according to the illustrative example of the present invention; FIG. 6C is a schematic diagram showing the results of GSIs according to the illustrative example of the present invention; and FIG. 7 is a schematic diagram showing the results of ISIs according to the illustrative example of the present invention.

Figure 6A:
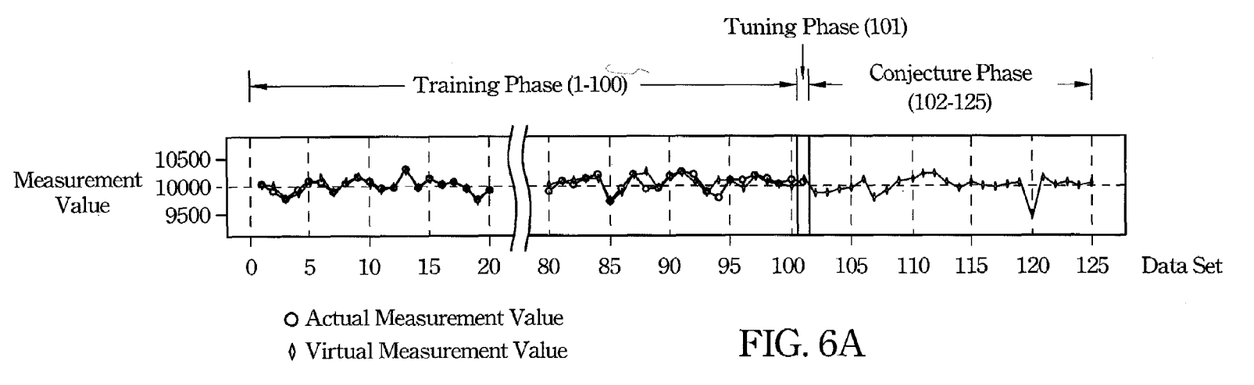
FIG. 6A to FIG. 6C are schematic diagrams respectively showing the results of virtual measurement values, actual measurement values, reliance indexes (RIs), and global similarity indexes (GSIs) according to an illustrative example of the present invention.
Figure 6B:
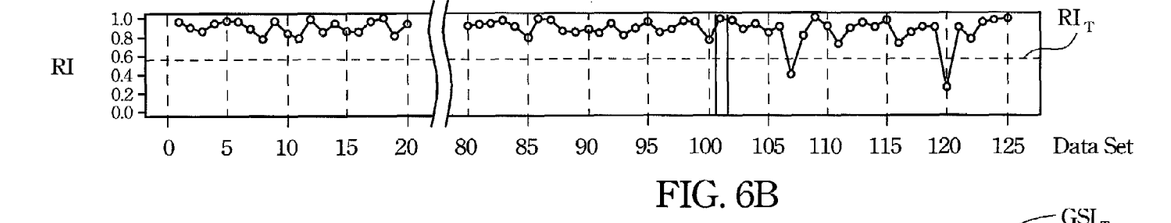
Figure 6C:
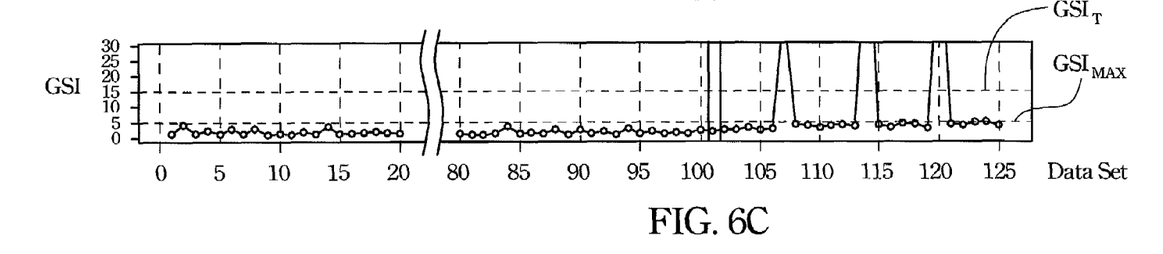
Figure 7:
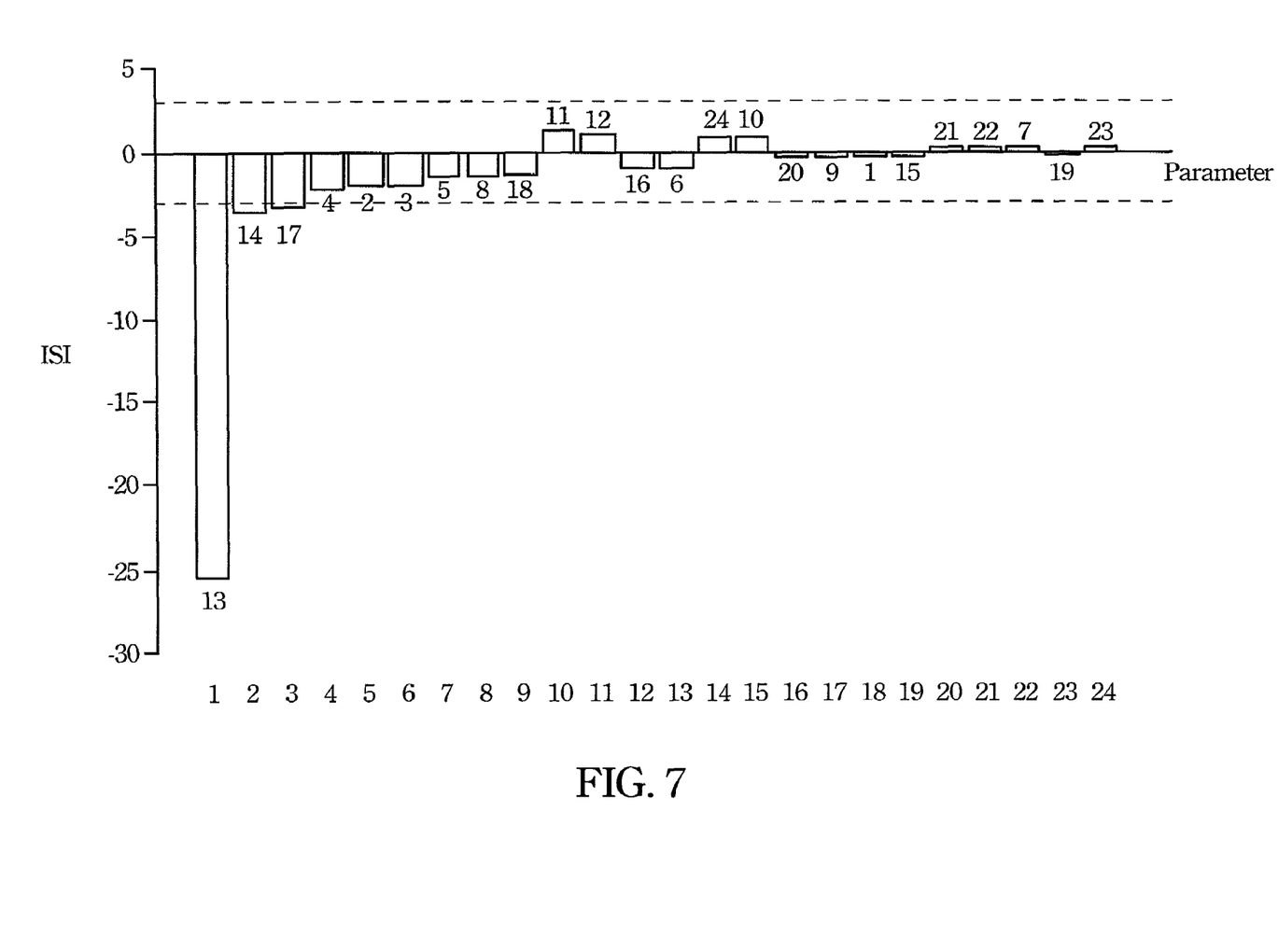
FIG. 7 is a schematic diagram showing the Pareto chart of individual similarity indexes (ISIs) according to the illustrative example of the present invention.

In the training phase (a=1, 2, ..., 100), both the actual and virtual measurement values are shown in FIG. 6A. The $RI_a$ and $GSI_a$ are illustrated in FIGS. 6B and 6C, respectively. The $RI_T$ (=0.567) is obtained with the specified $E_L$ (3%) and is depicted in FIG. 6B. The $GSI_{Max}$ during the training phase is approximately 5, so the $GSI_T$ is assigned to be 15. Both the $GSI_{Max}$ and $GSI_T$ are shown in FIG. 6C. During the tuning phase (b=101), both the actual and virtual measurement values, $RI_{101}$ and $GSI_{101}$ are shown in FIGS. 6A, 6B, and 6C, respectively. Regarding the conjecture phase (b=102, 103, ..., 125), only the virtual measurement values, $RI_b$, and $GSI_b$ are presented in FIGS. 6A, 6B, and 6C, respectively.

Observing the $107^{th}$ and $120^{th}$ data sets, since their RIs are smaller than the $RI_T$ indicates that there is no confidence on the virtual measurement values $\hat{y}_{N_{107}}$ and $\hat{y}_{N_{120}}$. Moreover, since their GSIs exceed the $GSI_T$, $\hat{y}_{N_{107}}$ and $\hat{y}_{N_{120}}$ are confirmed to have low reliability. Therefore, red lights are shown on $RI_{107}$ and $RI_{120}$. In these cases, their associated ISIs of the $107^{th}$ and $120^{th}$ sets process data must be checked to determine which process data deviate from the sets of historical process data for model-building, thereby locating the problem.

Referring to the $114^{th}$ data set, since its $RI_{114}$ is greater than the $RI_T$ but its $GSI_{114}$ exceeds the $GSI_T$, the corresponding ISIs of the $114^{th}$ set process data have to be checked for preventing overconfidence on the reliance level. $RI_{114}$ displays a blue light in this case.

Except for the $107^{th}$, $114^{th}$, and $120^{th}$ data sets, since the RIs of the remaining data sets exceed the $RI_T$, and since their corresponding GSIs thereof are smaller than the $GSI_T$, it is concluded that their corresponding virtual measurement values $\hat{y}_{N_b}$ are all reliant. As such, green lights are shown for all of the corresponding $RI_b$.

When $GSI_b > GSI_T$, the corresponding ISIs of the process data are examined to identify the cause of deviation. Taking the $107^{th}$ data set as an example and referring to FIG. 7, it reveals that the $13^{th}$ parameter in the ISI Pareto chart has the largest deviation.

It can be known from the preferred embodiment of the present invention that: the method of the present invention can effectively evaluate the reliance level of the conjecture result of the virtual metrology system; and gauge the degree of similarity between the input set process data and all of the sets of historical process data used for model-building, thereby assisting in evaluating the reliance level of the virtual metrology system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for evaluating reliance level of a virtual metrology system in product manufacturing, said method comprising:

obtaining a plurality of sets of historical process data belonging to a production equipment, wherein a plurality of historical products are manufactured by said production equipment in accordance with said sets of historical process data respectively;

obtaining a plurality of historical measurement values from a measurement equipment, wherein said historical measurement values are the actual measurement values of said historical products measured by said measurement equipment;

establishing a conjecture model by using said sets of historical process data and said historical measurement values, wherein said conjecture model is built in accordance with a conjecture algorithm;

establishing a reference model by using said sets of historical process data and said historical measurement values, wherein said reference model is built in accordance with a reference algorithm, and said conjecture algorithm is different from said reference algorithm;

obtaining a set of process data collected from said production equipment for manufacturing a first product and inputting said set of process data to said conjecture model, thereby computing a virtual measurement value of said first product and a standardized virtual measurement value of said first product;

inputting said set of process data of said first product to said reference model, thereby computing a reference prediction value of said first product and a standardized reference prediction value of said first product; and respectively calculating an overlap area between the statistical distribution of said at least one standardized virtual measurement value of said first product and the statistical distribution of said at least one standardized reference prediction value of said first product, thereby generating a reliance index (RI) of said standardized virtual measurement value, wherein said reliance index is higher when said overlap area is larger, representing that the reliance level of said standardized virtual measurement value corresponding to said reliance index is higher.

2. The method as claimed in claim 1, wherein said conjecture algorithm is selected from the group consisting of a multi-regression algorithm, a neural network (NN) algorithm, and a time series algorithm.

3. The method as claimed in claim 1, wherein said reference algorithm is selected from the group consisting of a multi-regression algorithm, a neural network algorithm, and a time series algorithm.

4. The method as claimed in claim 1, further comprising:

defining a maximal error limit between said virtual measurement value of said first product and said reference prediction value of said first product; and obtaining a RI threshold value ($RI_T$) that is defined as the reliance index (RI) value corresponding to said maximal error limit.

5. The method as claimed in claim 4, wherein said reliance index of said first product is reliable while being greater than said RI threshold.

6. The method as claimed in claim 1, further comprising:

obtaining a set of tuning-use process data collected from said production equipment for manufacturing a second product;

obtaining a tuning-use measurement value of said second product, wherein said tuning-use measurement value is the actual measurement value of said second product measured by said measurement equipment; and adjusting said conjecture model by using said set of tuning-use process data and said tuning-use measurement value.

7. The method as claimed in claim 6, further comprising:

adjusting said reference model by using said set of tuning-use process data and said tuning-use measurement value.

8. The method as claimed in claim 6, wherein during the operation of said production equipment, said set of tuning-use process data is adopted after said sets of historical process data, and before said set of process data of said first product desired to be conjectured.

9. The method as claimed in claim 1, further comprising:
establishing a statistical distance model by using said sets of historical process data in accordance with a statistical distance algorithm; and
inputting said set of process data of said first product into said statistical distance model, thereby computing a global similarity index (GSI) for said set of process data of said first product.

10. The method as claimed in claim 9, wherein said statistical distance algorithm is a Mahalanobis distance algorithm.

11. The method as claimed in claim 9, further comprising:
inputting said sets of historical process data into said statistical distance model, thereby computing a plurality of historical global similarity indexes respectively corresponding to said sets of historical process data; and
assigning a GSI threshold value ($GSI_T$) to be two to three times of the maximal historical GSI among said historical global similarity indexes.

12. The method as claimed in claim 11, wherein, when said GSI of said set of process data is smaller than said GSI threshold, it indicates that said set of process data has ever been trained, so that said virtual measurement value corresponding to said set of process data of said first product is relatively accurate.

13. The method as claimed in claim 11, further comprising:
when said GSI of said set of process data is greater than said GSI threshold, a plurality of individual similarity indexes (ISIs) of said set of process data are obtained for understanding the deviations of all of the individual parameters, wherein the individual similarity index of a process parameter of said set of process data is the standardized value (also called z score) of said process parameter via a standardization procedure, and the standardization procedure is performed in terms of the mean and standard deviation of the corresponding parameter in all of said sets of historical process data.

14. The method as claimed in claim 11, further comprising:
performing a first determination step to determine whether said reliance index of said first product is greater than said RI threshold;
performing a second determination step to determine whether said GSI of said set of process data corresponding to said reliance index is smaller than said GSI threshold; wherein
when the results of said first determination step and said second determination step are true, it indicates that there is strong confidence in said virtual measurement value of said first product;
when the result of said first determination step is true and the result of said second determination step is false, it indicates that, although the conjecture result of said first product is provided, yet some deviations may occur in said set of process data owing to the high GSI, and thus said set of process data with high individual similarity index (ISI) values has to be examined to prevent excessive confidence;
when the result of said first determination step is false and the result of said second determination step is true, it indicates that said virtual measurement value of said first product may be inaccurate, but the low GSI implies a high degree of similarity between said set of process data for manufacturing said first product and said sets of historical process data used for model-building, thus further investigation is required;
when the results of said first determination step and said second determination step are false, it indicates that said virtual measurement value of said first product is unreliable.

15. The method as claimed in claim 9, further comprising:
adjusting said statistical distance model by using a set of tuning-use process data collected from said production equipment for manufacturing a second product.

\* \* \* \* \*